Nov. 20, 1962  G. P. BAYNES ETAL  3,064,343
FRICTION ARTICLE AND METHOD FOR MOUNTING SAME
Original Filed Jan. 2, 1957  3 Sheets-Sheet 1

INVENTORS
GENE P. BAYNES
ROY E. BICKELHAUPT
ARTHUR B. BACKENSTO
BY John A. Young
ATTORNEY

INVENTORS
GENE P. BAYNES
ROY E. BICKELHAUPT
ARTHUR B. BACKENSTO
ATTORNEY

Nov. 20, 1962 G. P. BAYNES ETAL 3,064,343
FRICTION ARTICLE AND METHOD FOR MOUNTING SAME
Original Filed Jan. 2, 1957 3 Sheets-Sheet 3

INVENTORS
GENE P. BAYNES
ROY E. BICKELHAUPT
ARTHUR B. BACKENSTO
BY John A. Young
ATTORNEY United States Patent Office 3,064,343
Patented Nov. 20, 1962

3,064,343
FRICTION ARTICLE AND METHOD FOR
MOUNTING SAME
Gene P. Baynes, Green Island, Roy E. Bickelhaupt, Troy, and Arthur B. Backensto, New York, N.Y., assignors to The Bendix Corporation, a corporation of Delaware
Continuation of application Ser. No. 632,203, Jan. 2, 1957. This application Dec. 18, 1958, Ser. No. 781,310
4 Claims. (Cl. 29—420)

This invention relates to an inorganic friction article and the method for mounting the article on a conventional T-section brake shoe by a simple welding process which reliably holds the friction article in friction-producing relation during the wear life of the brake. This application is a continuation of application Serial No. 632,203, filed January 2, 1957, now abandoned.

Since the discovery of the improved friction character of metallic-ceramic friction compositions, for aircraft and heavy-duty clutch applications, considerable efforts have been made to adapt the friction material for automotive brake usage. The same properties which have made the friction material desirable in aircraft brake usage also make it attractive for usage in automobile brake applications. The friction material is fade-resistant, has a high degree of consistent effectiveness, and tends to wear at a slower rate than conventional organic type linings.

While the combination metal-ceramic friction lining is superior in many respects to the inorganic lining, it has presented from the start a serious problem of how to secure the lining to a mounting member.

One proposal for mounting the improved lining is to drill openings in the lining and rivet the material to the brake shoe in much the same manner as is done with organic friction material linings. This is disadvantageous because by nature the friction material is difficult to drill, and, second, the more friable character of the material increases the likelihood of damage during a riveting operation than is the case with an organic type lining.

We propose in the present invention a means for securing a metallic-ceramic friction material lining to a conventional brake shoe by a welding process which does not involve subjecting the lining to any impact stresses and thus minimizes the possibility of damage to the article while it is being secured to a conventional brake shoe.

It is another feature of this invention to provide a resilient backing member mortised with the lining, the purpose of the backing member being to strengthen the metallic-ceramic friction material and thereby prevent its crumbling or breaking up during usage. The perforated backing member also serves to provide attachment surfaces for securing the lining to the mounting member which can be a conventional brake shoe. Other objects and features of the invention will be developed from a consideration of the following description which proceeds with reference to the accompanying drawings, wherein.

Figure 1:
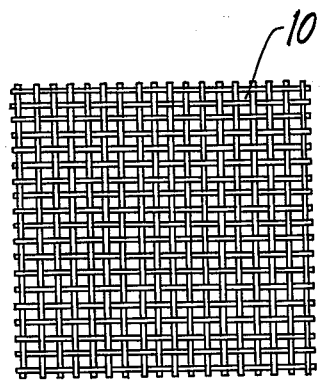
FIGURE 1 is a detail view of the screen or perforated member which is used to reinforce the friction material against crumbling and also serves as the attaching surface for securing the lining to the rim of a brake shoe.
Figure 2:
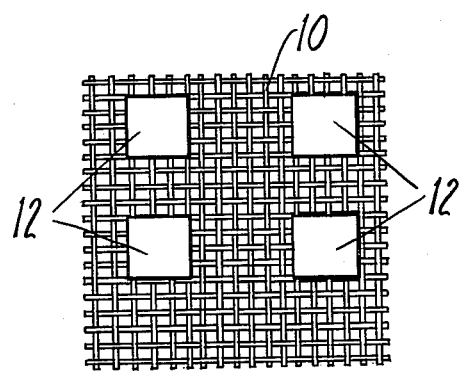
FIGURE 2 shows shim stock placed over the surface of the screen of FIGURE 1 in order to serve as a shielding between the friction lining and the screen, which prevents the friction material from permeating the voids covered by said shim stock.

Referring now to the drawings, there is provided a perforated screen 10 which approximately corresponds in width and length to the finished friction article. In order to prevent the edges of the screen from protruding through the finished article, the screen is cut slightly undersize, but not so much so that lack of reinforcement at the edges of the friction article will cause a crumbling thereof. The thickness and mesh size of the screen can obviously vary but for an example, the screen is about 8 mesh and about 18 gauge. The screen wire is annealed so that it can be shaped to an arcuate form and will not have a tendency to spring back to a flat shape from its arcuately formed shape. The arcuate form is the finished shape of the friction article, the purpose being to conform the segment of the lining to the outer surface of the rim of a conventional brake shoe.

Figure 5:
FIGURE 5 is a side view of the slightly arcuately shaped finished friction article with a portion broken away to show the embedded screen.

Four pieces of flat steel sheet metal shim stock 12 are placed near or adjacent the four corners of the screen and a layer of friction material lining 14 (FIGURE 5) is then compacted over the shim stock pieces 12. The construction and composition of the shim stock forms no important part of the present invention. The particle size of the friction material, which is composed principally of metal powders and granular ceramic friction material, is sufficiently small and ductile so that it is extrudible within the interstices of the screen 10 and is thereby mortised with the screen.

The specific composition of the friction material forms no essential part of the present invention; a number of acceptable friction material linings are disclosed in U.S. application No. 545,637, filed November 8, 1955, now Patent No. 2,784,105, issued March 5, 1957, and U.S. application No. 602,480, filed July 20, 1956.

After the friction material lining is compacted over the screen, and is mortised therewith, the article is then sintered to coalesce the metallic friction articles and thus permanently embed the screen 10 within the friction article. The screen appears to lend greater cohesiveness to the friction material since there is less tendency for the lining to crack or crumble under impact loading. Also the friction material has less tendency to fragment and fall apart during the final period of the wear life of the article.

Figure 3:
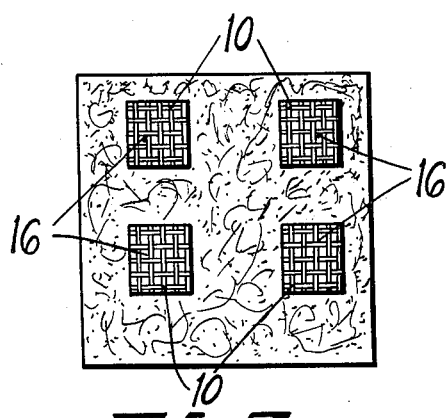
FIGURE 3 is the undersurface of the finished friction article.
Figure 4:
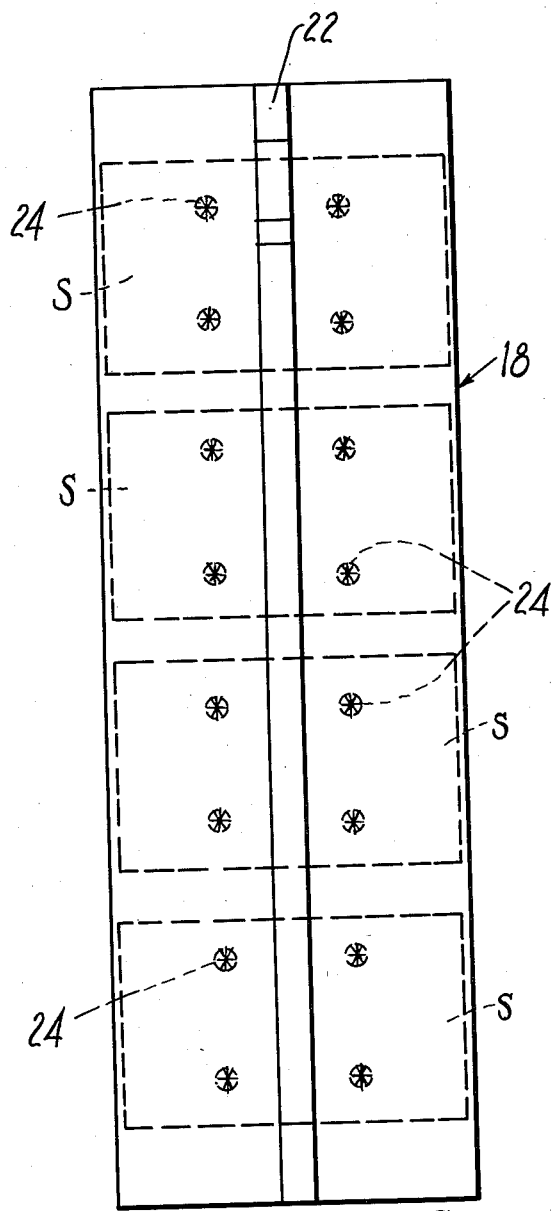
FIGURE 4 is the underside of the brake shoe with the friction material segments of FIGURE 3 secured thereto.

The screen appears to be of considerable benefit in preventing chipping and erosion of the lining along the edges thereof. Referring to FIGURE 3, (which shows the undersurface of the friction segment) it will be noted that friction material 14 has not been extruded within the portions of the screen which have been shielded by the shim stock 12; that is, although the friction material has permeated the entire screen, the regions 16 which have been shielded by the shim stock members 12 remain substantially free of the friction material. The regions 16 of the screen 10 serve as the attachment surfaces for holding the segments of lining on a conventional brake shoe 18.

The brake shoe 18 comprises an arcuate rim 20 having a transverse strengthening web 22. A series of four openings 24 in the rim 20 are provided for each segment of the brake lining. Four lining segments S are used on the secondary brake shoe and three lining segments may be used on the primary brake shoe. (Our experimentation has thus far been limited to the duo-servo construction brake, but there is no evidence to indicate that the disclosed attaching means for securing lining to the shoe is limited to any specific shoe arrangement.) The regions 16 which have been shielded by shim stock 12 are matched with the openings 24 in the rim of the brake shoe and the regions 16 of the screen are then arc welded to the undersurface of the rim 20. We have found that the welding provides a tenacious and reliable securement of the screen to the rim and there is adequate mortising between the friction material lining and the screen so that the segment S as a whole is reliably held on the rim of the shoe during the useful life of the brake.

In evaluating the attaching means we took the following factors into account:

The attaching means produced no significant scoring of the drum; the pieces had sufficient strength so that they did not readily crumble or break even though there was no retainer cup, which is oftentimes provided in combination with a metal-ceramic composition; the erosion rate of the lining incident to application was acceptable.

During compacting and coining of the friction segment (referring to FIGURE 5) the segment is shaped to an arcuate form so that it will lie flat against the outer surface of the rim 20; this full contact between the segment and the outer rim insures maximum support for the piece against fracture under the influence of drum reaction forces. As explained previously, the wire screen is annealed so that when it is shaped to this arcuate form, it does not tend to spring back and thus cause the friction segment to lose its desired form.

We have tested extensively, and have substantiated an improvement for as little as two pieces of the inorganic friction segments on the primary shoe and as many as four pieces on the secondary shoe. It is desirable, of course, in the interests of economy to reduce to a minimum the number of pieces per shoe. The length of the piece of lining segment is determined by the maximum tolerable range of density between the ends of the piece and the center of the piece. It has been found that the greater the chordal length of the piece of lining segment, the greater the variation in density of the lining material between the ends of the piece and the center of the piece. A consideration tending toward increasing the length of the segment S is that the greater the length of the individual piece, the less the total number of pieces necessary for attachment to the shoe. These two considerations must be compromised, and we have found a workable compromise, in utilizing a segment S with a length of 2¼ inches, and a width of about 2½ inches. This provides a nearly square piece which is easy to handle and is formable with an arcuate rectangular shape which can easily fit most of the present day commercial automotive brakes.

Figure 6:
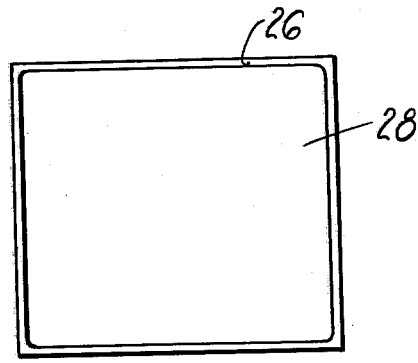
FIGURE 6 is a front view of the finished friction segment looking in the direction of the arrows 6—6 in FIGURE 5.

Referring to FIGURE 6, it will be noted from the front view of the friction segment S that the edges 26 of the friction segment are beveled to reduce the likelihood of edge crumbling of the segment. During use, the outer surface 28 of the segment is brought into engagement with the cylindrical drum surface.

Figure 7:
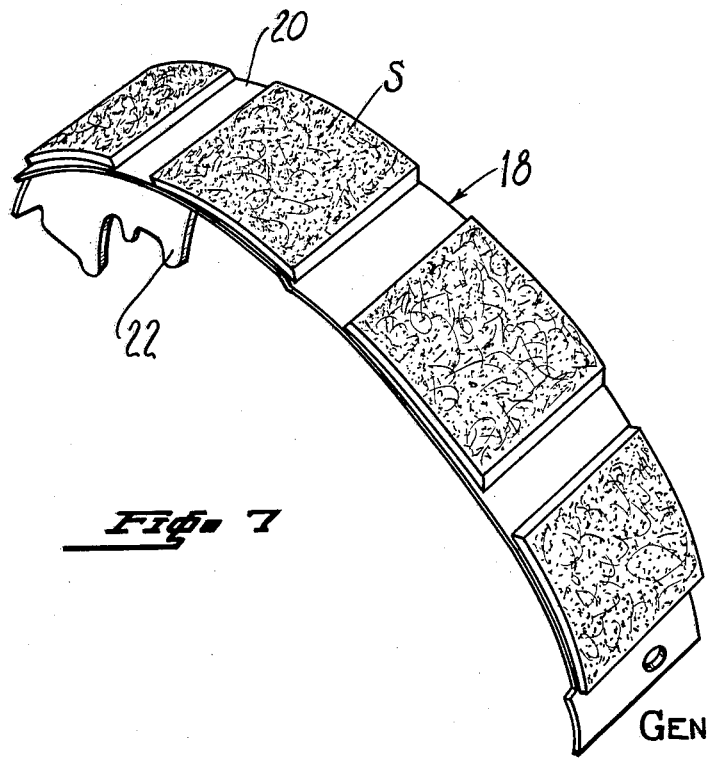
FIGURE 7 is a prospective view of a brake shoe which is provided with four segments of the inorganic friction lining, the segments being of substantially the shape and construction shown in FIGURES 5 and 6.

Referring to FIGURE 7, the friction segments are arranged along the length of the rim of the brake shoe and, after attachment of the segments S, the outer surfaces can be ground so that they will present a friction surface which is concentric with the cylindrical drum surface; thus, there is avoided localized wear of one of the segments owing to eccentricity of the friction surface and the internal cylindrical drum surface.

The present invention is particularly adaptable for those brake lining formulations in which the composition of the binder or predominant metallic constituent of the lining precludes spot welding or projection welding the composition to the shoe rim, in which case the present invention provides a suitable means for weld bonding an otherwise non-weldable friction composition to the brake shoe rim.

Although only one illustrative embodiment of the invention in the form of a single structure, and single process of attachment, has been chosen to describe the invention, it will be apparent to those skilled in the art that numerous modifications and changes can be made without departing from the underlying principles of the invention. It is intended that such variations and revisions which do incorporate the principles of the invention will be included within the scope of the following claims.

We claim:

1. A method of attaching frangible material to a structural member comprising: providing a foraminous backing member, providing a piece of strip material that is considerably smaller than said foraminous backing member, providing powder of said frangible material, placing said powder and foraminous backing member between the opposing working surfaces of a press with said piece of strip material interpositioned and abutting said foraminous backing member and one of said opposing working surfaces of said press, forcing said opposing working surfaces together with sufficient force to compact said powder about both sides of said foraminous backing member except where said foraminous backing member is abutted by said piece of strip material, removing said piece of strip material from the compact so formed to expose said foraminous backing member, and welding the portion of said foraminous backing member exposed by the removal of said piece of strip material to said structural member.

2. A method of attaching frangible material to a structural member comprising: providing a foraminous backing member, providing a piece of strip material that is considerably smaller than said foraminous backing member, providing powder of said frangible material, placing said powder and foraminous backing member between the opposing working surfaces of a press with said piece of strip material interpositioned and abutting said foraminous backing member and one of said opposing working surfaces of said press, forcing said opposing working surfaces together with sufficient force to compact said powder about both sides of said foraminous backing member except where said foraminous backing member is abutted by said piece of strip material, sintering the compact so formed, removing said piece of strip material from the compact so formed to expose said foraminous backing member, and welding the portion of said foraminous backing member exposed by the removal of said piece of strip material to said structural member.

3. A method of attaching frangible material to a structural member comprising: providing a foraminous backing member, placing a piece of strip material considerably smaller than said foraminous backing member on the bed of a press, placing said foraminous backing member over said piece of strip material, spreading a powdered material over said foraminous backing member, pressing said powder against said backing member and the bed of said press to compact said powder about both sides of said foraminous backing member except where said foraminous backing member is abutted by said piece of strip material, heating the compact so formed until the particles of powder are at least partially sintered, removing said piece of strip material from the compact to expose said foraminous backing member, and welding the portion of said backing member exposed by the removal of said piece of strip material to said structural member.

4. A method of attaching frangible material to a structural member comprising: providing a foraminous backing member, placing a piece of strip material that is considerably smaller than said foraminous backing member on the bed of a press, placing said foraminous backing member over said piece of strip material, spreading a powdered material over said foraminous backing member, said powder material including over approximately 50% by volume of a powdered metal, pressing said powder around said backing member except where said strip is located until the powder and backing member are united to form a rigid body, heating said rigid body until the particles of powdered metal are at least partially sintered, removing said piece of strip material from the rigid body to expose said foraminous backing member, and welding the portion of said backing member exposed by the removal of said piece of strip material to said structural member.

References Cited in the file of this patent

UNITED STATES PATENTS

| | | |
|---|---|---|
| 1,919,967 | Thompson | July 25, 1933 |
| 1,947,894 | Whitworth | Feb. 20, 1934 |
| 2,072,070 | Fisher | Feb. 23, 1937 |
| 2,080,314 | Hoof | May 11, 1937 |
| 2,277,107 | Imes | Mar. 24, 1942 |
| 2,289,311 | Wellman | July 7, 1942 |
| 2,781,107 | Smith et al. | Feb. 12, 1957 |